(12) United States Patent
Cooley et al.

(10) Patent No.: US 8,479,010 B2
(45) Date of Patent: Jul. 2, 2013

(54) DETECTING, CAPTURING AND PROCESSING VALID LOGIN CREDENTIALS

(75) Inventors: Shaun Cooley, El Segundo, CA (US); Brian Hernacki, Mountain View, CA (US); Bruce McCorkendale, Manhattan Beach, CA (US)

(73) Assignee: Symantec Corporation, Mountain View, CA (US)

( * ) Notice: Subject to any disclaimer, the term of this patent is extended or adjusted under 35 U.S.C. 154(b) by 1418 days.

(21) Appl. No.: 12/044,836

(22) Filed: Mar. 7, 2008

(65) Prior Publication Data

US 2009/0228978 A1 Sep. 10, 2009

(51) Int. Cl.
*G06F 21/00* (2006.01)

(52) U.S. Cl.
USPC ............... 713/183; 713/187; 726/19; 726/28

(58) Field of Classification Search
USPC ............................. 726/19, 28; 713/183, 187
See application file for complete search history.

(56) References Cited

U.S. PATENT DOCUMENTS

| | | | |
|---|---|---|---|
| 5,875,296 A | 2/1999 | Shi et al. | |
| 6,851,060 B1 * | 2/2005 | Shrader | 726/10 |
| 7,281,029 B2 * | 10/2007 | Rawat | 709/204 |
| 2003/0101166 A1 | 5/2003 | Uchino et al. | |
| 2003/0159071 A1 | 8/2003 | Martinez et al. | |

FOREIGN PATENT DOCUMENTS

| | | |
|---|---|---|
| GB | 2 354 854 A | 4/2001 |
| JP | 2007-094903 A | 10/2003 |

OTHER PUBLICATIONS

Extended European Search Report for Application No. 09003316.8-1245 dated Jun. 2, 2009.
Cheah Chu Yeow, "Firefox Secrets," Jun. 1, 2005, retrieved from the Internet: URL:http://proquest.safaribooksonline.com/0975240242>.
"redemption in a blog," Sep. 7, 2007, retrieved from the Internet: URL:http://blog.codefront.net/2007/09/07/smarter-and-less-annoying-password-manager-in-firefox-3/>.
English language translation of Official Action from Japanese Patent Office in counterpart Application No. 2009-051771 dated Jan. 10, 2012, 3 pages.
English languate translation of Official Action from Chinese Patent Office in counterpart Application No. 200910127241.1 dated May 6, 2011, 7 pages.

(Continued)

*Primary Examiner* — Ali Abyaneh
*Assistant Examiner* — Paul Callahan
(74) *Attorney, Agent, or Firm* — Brill Law Office; Jeffrey Brill

(57) ABSTRACT

Successful logins are distinguished from unsuccessful logins, and only when a login is successful are the user's login credentials stored and associated with the appropriate login page. Attempts by a user to login to a login page with a set of login credentials are identified. It is determined whether an attempt to login to a given login page with a set of login credentials is successful. If the attempt by the user to login to the login page with the set of login credentials is successful, the set of login credentials can be stored and associated with the login page. If the attempt fails, the credentials are not saved.

18 Claims, 1 Drawing Sheet

OTHER PUBLICATIONS

English languate translation of Official Action from Chinese Patent Office in counterpart Application No. 200910127241.1 dated Jan. 5, 2012, 7 pages.

English language translation of pertinent portion of Error&Keikoku Message Taisyohou, Nikkei Pasokon, No. 529, Japan, Nikkei BP, May 14, 2007, p. 41, 1 page.

Official Action from European Patent Office for European Counterpart Application No. 09003316.8-1245 dated Apr. 18, 2011, 8 pages.

Translation of Chinese Office Action in Co-pending Chinese Counterpart Application, Aug. 4, 2010, 7 pages.

* cited by examiner

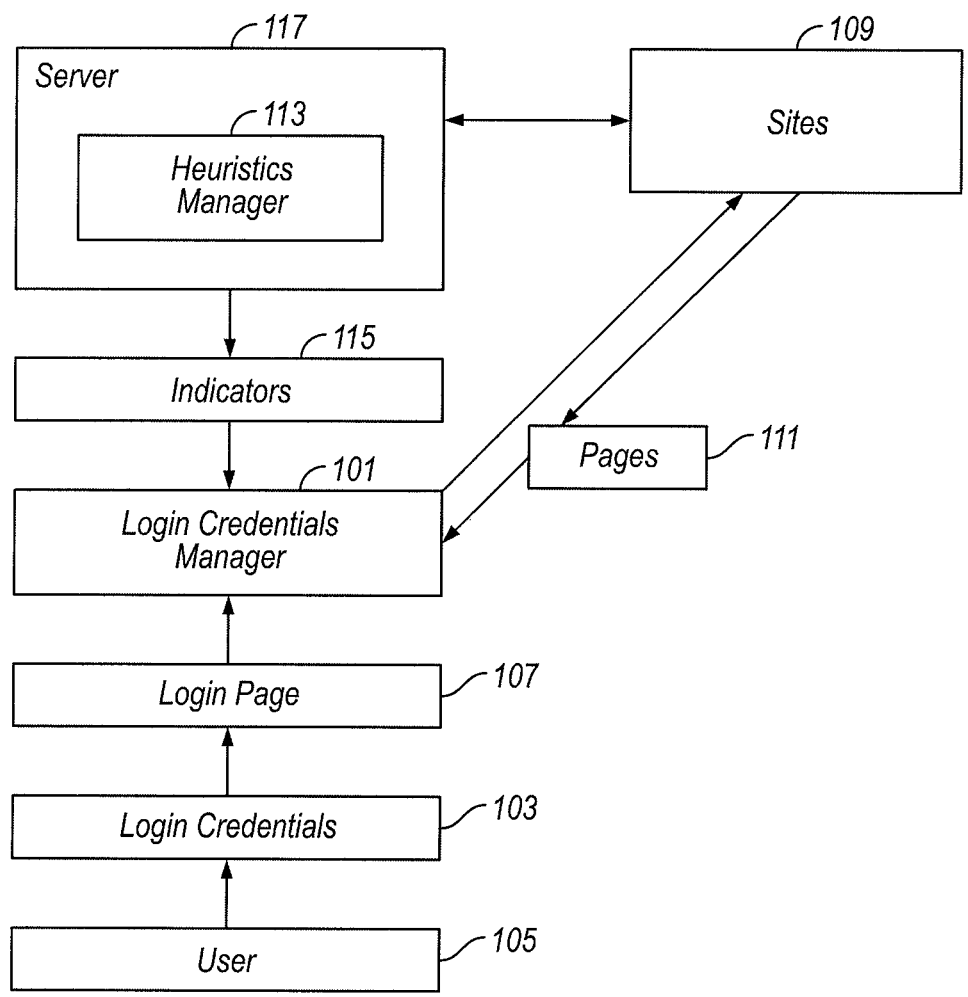

DETECTING, CAPTURING AND PROCESSING VALID LOGIN CREDENTIALS

TECHNICAL FIELD

This invention pertains generally to password capture and auto-fill utilities, and more specifically to distinguishing between successful and failed logins, and only saving entered login credentials associated with the former.

BACKGROUND

Existing password capture and auto-fill utilities offer to save entered passwords and other user login credentials, so that the user need not type them in every time the same logon screen is encountered. However, these utilities offer to save login credentials as soon as they are entered, regardless of whether or not they are valid. Because users often accidently mistype their passwords and such, these utilities commonly save invalid credentials. These saved invalid credentials are then used to auto-fill login screens, resulting in additional failed logins.

When a user enters incorrect login credentials, the resulting page often prompts the user to reenter their user id and password, and thus contains corresponding entry fields. The existing utilities detect these entry fields, and classify the failed login page as a new site. As such, the entered login credentials are separately saved, associated with the credential reentry page, and only used for auto-fill purposes if the user encounters the failed login page again. If the user enters incorrect credentials a second time (not an uncommon occurrence), the problem is further aggravated by the saving of invalid credentials for the initial login page and the credential reentry page.

What is needed is a password capture and auto-fill utility that does not have these shortcomings.

SUMMARY

Successful logins are distinguished from unsuccessful logins, and only when a login is successful are the user's login credentials stored and associated with the appropriate login page. Attempts by a user to login to a login page with a set of login credentials are identified. It is determined whether an attempt to login to a given login page with a set of login credentials is successful. If the attempt by the user to login to the login page with the set of login credentials is successful, the set of login credentials can be stored and associated with the login page. If the attempt fails, the credentials are not saved.

The features and advantages described in this summary and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

BRIEF DESCRIPTION OF THE DRAWINGS

FIG. 1 is a block diagram illustrating operations of a login credentials manager, according to some embodiments of the present invention.

The Figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

FIG. 1 illustrates a login credentials manager 101 distinguishing between successful and failed logins, according to some embodiments of the present invention. It is to be understood that although various components are illustrated in FIG. 1 as separate entities, each illustrated component represents a collection of functionalities which can be implemented as software, hardware, firmware or any combination of these. Where a component is implemented as software, it can be implemented as a standalone program, but can also be implemented in other ways, for example as part of a larger program, as a plurality of separate programs, as a kernel loadable module, as one or more device drivers or as one or more statically or dynamically linked libraries.

As illustrated in FIG. 1, the login credentials manager 101 captures login credentials 103 entered by users 105 on login pages 107. Techniques for identifying login pages 107 and capturing entered credential data 103 are well known to those of ordinary skill in the relevant art. The use of these techniques within the context of the present invention will be readily apparent to one of such a skill level in light of this specification.

Rather than saving all entered login credentials 103 and associating them with the login screen 107 into which they were entered, the login credentials manager 101 determines whether the subsequent attempt to logon with the entered credentials 103 is successful. Only if the login attempt succeeds does the login credentials manager 101 save the credentials 103 and associate them with the appropriate login page 107.

Success or failure of a login attempt can be detected in various ways. In one embodiment, the login credentials manager 101 profiles various popular sites 109, and determines the expected series of pages 111 that result from both successful and failed attempts to login to these sites 109. The login credentials manager 101 then compares the pages that result from the user's attempt to login to a specific site 109 to the expected series of pages 111 for success and/or failure. The login credentials manager 101 can thus determine the result of the login attempt from the actual series of pages 111 encountered by the user 105. This methodology is very accurate, but is limited to profiled sites 109.

A more general approach is used in another embodiment, in which a set of heuristics is used to detect success versus failure of login attempts. A heuristics manager 113 profiles results sequences from both successful and failed login attempts for a wide variety of sites 109, and identifies common indicators 115 of successful logins and of failed logins. Machine learning can be used to detect the key features needed for accurately identifying pages that result from failed login attempts and from successful attempts. Note that as illustrated, the heuristics manager 113 can run on a central server 117, and provide the indicators 115 to login credentials managers 101 running on a plurality of user computers. Of course, such functionality can also be performed locally at a user computer level, or distributed between multiple computing devices as desired. The implementation mechanics of profiling the results of multiple login attempts and identifying common indicators 115 of success and/or failure is known to those of ordinary skill in the relevant art, and the use thereof within the context of the present invention will be readily apparent to those of such a skill level in light of this specification.

The following non-exhaustive examples are the type of heuristic indicators 115 that can be used for determining the results of a login attempt. If a login attempt results in a page with the term "incorrect" or "invalid" in combination with one or more of the terms "user id," "id," "user name," "email address" and "password," it is likely that the login attempt failed. Other examples are the terms "login" or "sign on" in combination with the terms "failure" or "failed." Likewise, the language "forgot your password?," "try again" or "retry" are all generally indicative of a failed login attempt.

Additionally, if a login page 107 is followed immediately by another login page 107, it is a strong indicator 115 that the login attempt failed. If the second login page 107 contains the same entry prompts, then the indication 115 that the login failed is even stronger. In some cases, the failed login/retry page has the same URL as the initial login page 107, which can also be used to detect a failed login attempt.

Note that the above examples all show indicators 115 of failure. In some embodiments, a lack of any indication 115 of failure itself indicates success. In some embodiments, specific indications 115 of success are utilized. For example, if a login attempt results in a page with the term "welcome" in combination with user's id, it is likely that the login attempt succeeded.

With access to the success and failure indicators 115, the login credentials manager 101 can determine whether given login attempts are successful or otherwise. The implementation mechanics of analyzing the results of login attempts against indicators 115 of successful and/or failed logins is known to those of ordinary skill in the relevant art, and the use thereof within the context of the present invention will be readily apparent to those of such a skill level in light of this specification. For example, the login credentials manager 101 can use existing login page identification techniques for determining that a page following a login attempt is itself another login page 107. The login credentials manager 101 can determine from that detected result and the corresponding heuristic login failure indicator 115 that the login attempt failed, and that the user is being prompted to resubmit his/her login credentials 103. Likewise, the login credentials manager 101 can determine whether the subsequent login page 107 is prompting the user to enter the same entry fields as the first login page 107 by examining the field ID/name in the underlying HTML. Whether this is occurring within the same FORM tag can be determined by the get/post URL. It is to be understood that the specific heuristic indicators 115 to use and what results specifically are to be considered conclusively indicative of successful and/or failed logins are variable design parameters.

In any case, these types of heuristics, especially when used in combination, can detect login success and failure with a high degree of accuracy. As noted above, the login credentials manager 101 only offers to save login credentials 103 for future auto-fill purposes when a login is successful. If a login failed, it means that the entered credentials 103 were not correct, and should not be saved. If a subsequent login screen 107 appears after a failed login attempt, the login credentials manager 101 recognizes that this is not some unrelated login screen 107, for which a separate set of credentials 103 should be saved, but is instead providing a second chance for the user 105 to login to the initial site. If the second or a subsequent attempt is successful, the login credentials manager 101 offers to save the successfully used credentials 103, and associates them with the initial login page 107, not the retry screen.

Additionally, the login credentials manager 101 can determine when stored credentials 103 that were previously good have changed, and thus need to be updated. More specifically, because the login credentials manager 101 only stores valid login credentials 103, previously saved credentials 103 are presumed to have been good at the time they were saved. If a login attempt using previously saved credentials 103 fails, the login credentials manager 101 determines that the credentials 103 have been updated subsequent to the time they were saved, and thus the updated credentials 103 need to be entered and stored.

As will be understood by those familiar with the art, the invention may be embodied in other specific forms without departing from the spirit or essential characteristics thereof. Likewise, the particular naming and division of the portions, modules, agents, managers, components, functions, procedures, actions, layers, features, attributes, methodologies and other aspects are not mandatory or significant, and the mechanisms that implement the invention or its features may have different names, divisions and/or formats. Furthermore, as will be apparent to one of ordinary skill in the relevant art, the portions, modules, agents, managers, components, functions, procedures, actions, layers, features, attributes, methodologies and other aspects of the invention can be implemented as software, hardware, firmware or any combination of the three. Of course, wherever a component of the present invention is implemented as software, the component can be implemented as a script, as a standalone program, as part of a larger program, as a plurality of separate scripts and/or programs, as a statically or dynamically linked library, as a kernel loadable module, as a device driver, and/or in every and any other way known to those of skill in the art of computer programming. Additionally, the present invention is in no way limited to implementation in any specific programming language, or for any specific operating system or environment. Furthermore, it will be readily apparent to those of ordinary skill in the relevant art that where the present invention is implemented in whole or in part in software, the software components thereof can be stored on computer readable media as computer program products. Any form of computer readable medium can be used in this context, such as magnetic or optical storage media. Additionally, software portions of the present invention can be instantiated (for example as object code or executable images) within the memory of any programmable computing device. Accordingly, the disclosure of the present invention is intended to be illustrative, but not limiting, of the scope of the invention, which is set forth in the following claims.

What is claimed is:

1. A computer implemented method for storing only valid login credentials, the method comprising the steps of:

identifying, by a computer, a login page of a website visited by a user;

determining, by the computer, from web page content, whether an attempt by the user to login to the login page of the website with a set of login credentials is successful, comprising:

analyzing, by the computer, at least one page resulting from the attempt by the user to login to the login page against at least one heuristic indicator from a group of heuristic indicators consisting of: at least one heuristic indicator of a successful login attempt and at least one heuristic indicator of an unsuccessful login attempt;

determining, by the computer, that the attempt by the user to login to the login page with the set of login credentials is not successful;

determining, by the computer, that the set of login credentials is stored such that it is associated with the login page;

responsive to the attempt by the user to login to the login page with the stored set of login credentials not being successful, determining, by the computer, that the set of login credentials have been updated subsequent to having been stored;

prompting, by the computer, the user to enter an updated set of login credentials into the login page;

determining, by the computer, whether an attempt by the user to login to the login page with the updated set of login credentials is successful; and only in response to the attempt by the user to login to the login page with the updated set of login credentials being successful, prompting, by the computer, the user to store the updated set of login credentials and associate them with the login page.

2. The method of claim 1 further comprising:

responsive to receiving an indication from the user to store the updated set of login credentials, storing, by the computer, the updated set of login credentials; and associating, by the computer, the stored updated set of login credentials with the login page.

3. The method of claim 1 wherein determining, by the computer, whether the attempt by the user to login to the login page with the set of login credentials is successful further comprises:

comparing, by the computer, at least one page resulting from the attempt by the user to login to the login page with at least one page expected to result from an attempt to login to a site associated with the login page.

4. The method of claim 3 further comprising:

profiling, by the computer, a plurality of sites to determine pages expected to result from successful and unsuccessful attempts to login.

5. The method of claim 1 further comprising:

heuristically analyzing, by the computer, a plurality of pages resulting from successful and unsuccessful attempts to login to a plurality of sites; and identifying, by the computer, common indicators of at least one from a group of login types consisting of: successful logins and unsuccessful logins.

6. The method of claim 1 wherein determining, by the computer, whether the attempt by the user to login to the login page with the set of login credentials is successful further comprises:

determining, by the computer, that the attempt by the user to login to the login page is not successful responsive to determining that the attempt by the user to login to the login page results in a second login page.

7. At least one non-transitory computer readable medium storing a computer program product for storing only valid login credentials, the computer program product comprising:

program code for identifying a login page of a website visited by a user;

program code for determining from web page content, whether an attempt by the user to login to the login page of the website with a set of login credentials is successful, comprising:

program code for analyzing at least one page resulting from the attempt by the user to login to the login page against at least one heuristic indicator from a group of heuristic indicators consisting of: at least one heuristic indicator of a successful login attempt and at least one heuristic indicator of an unsuccessful login attempt;

program code for determining that the attempt by the user to login to the login page with the set of login credentials is not successful;

program code for determining that the set of login credentials is stored such that it is associated with the login page;

program code for, responsive to the attempt by the user to login to the login page with the stored set of login credentials not being successful, determining that the set of login credentials have been updated subsequent to having been stored;

program code for prompting the user to enter an updated set of login credentials into the login page;

program code for determining whether an attempt by the user to login to the login page with the updated set of login credentials is successful; and program code for, only in response to the attempt by the user to login to the login page with the updated set of login credentials being successful, prompting the user to store the updated set of login credentials and associate them with the login page.

8. The computer program product of claim 7 further comprising:

program code for, responsive to receiving an indication from the user to store the updated set of login credentials, storing the updated set of login credentials; and program code for associating the stored updated set of login credentials with the login page.

9. The computer program product of claim 7 wherein the program code for determining whether the attempt by the user to login to the login page with the set of login credentials is successful further comprises:

program code for comparing at least one page resulting from the attempt by the user to login to the login page with at least one page expected to result from an attempt to login to a site associated with the login page.

10. The computer program product of claim 9 further comprising:

program code for profiling a plurality of sites to determine pages expected to result from successful and unsuccessful attempts to login.

11. The computer program product of claim 7 further comprising:

program code for heuristically analyzing a plurality of pages resulting from successful and unsuccessful attempts to login to a plurality of sites; and program code for identifying common indicators of at least one from a group of login types consisting of: successful logins and unsuccessful logins.

12. The computer program product of claim 7 wherein the program code for determining whether the attempt by the user to login to the login page with the set of login credentials is successful further comprises:

program code for determining that the attempt by the user to login to the login page is not successful responsive to determining that the attempt by the user to login to the login page results in a second login page.

13. A computer system for storing only valid login credentials, the computer system comprising:

a memory;

a login credentials manager at least partially implemented in hardware, the login credentials manager being configured to identify a login page of a web site visited by a user, to determine, from web page content, whether an attempt by the user to login to the login page of the website with a set of login credentials is successful, comprising analyzing at least one page resulting from the attempt by the user to login to the login page against at least one heuristic indicator from a group of heuristic indicators consisting of: at least one heuristic indicator of a successful login attempt and at least one heuristic indicator of an unsuccessful login attempt, to determine that the attempt by the user to login to the login page with the set of login credentials is not successful, to determine that the set of login credentials is stored such that it is associated with the login page, to determine, responsive to the attempt by the user to login to the login page with the stored set of login credentials not being successful, that the set of login credentials have been updated subsequent to having been stored, to prompt the user to enter an updated set of login credentials into the login page, to determine whether an attempt by the user to login to the login page with the updated set of login credentials is successful, and to prompt, only in response to the attempt by the user to login to the login page with the updated set of login credentials being successful, the user to store the updated set of login credentials and associate them with the login page.

14. The computer system of claim 13 further comprising:
a heuristics manager to heuristically analyze a plurality of pages resulting from successful and unsuccessful attempts to login to a plurality of sites, and to identify common indicators of at least one from a group of login types consisting of: successful logins and unsuccessful logins.

15. The computer system of claim 13 wherein:
the login credentials manager is further to store, responsive to receiving an indication from the user to store the updated set of login credentials, the updated set of login credentials, and to associate the stored updated set of login credentials with the login page.

16. The computer system of claim 13 wherein:
the login credentials manager is further to compare at least one page resulting from the attempt by the user to login to the login page with at least one page expected to result from an attempt to login to a site associated with the login page.

17. The computer system of claim 13 wherein:
the heuristics manager is further to profile a plurality of sites to determine pages expected to result from successful and unsuccessful attempts to login.

18. The computer system of claim 13 wherein:
the login credentials manager is further to determine that the attempt by the user to login to the login page is not successful responsive to determining that the attempt by the user to login to the login page results in a second login page.

* * * * *